US012686449B2

(12) United States Patent
Šoštarić et al.

(10) Patent No.: US 12,686,449 B2
(45) Date of Patent: Jul. 21, 2026

(54) ACTIVE AERODYNAMICS SYSTEM FOR A VEHICLE

(71) Applicant: BUGATTI RIMAC D.O.O., Sveta Nedelja (HR)

(72) Inventors: David Šoštarić, Čakovec (HR); Rok Marič, Ljutomer (SI); Varun Ramakrishnan, Bengaluru (IN); Timotheus van Pelt, Rotterdam (NL)

(73) Assignee: BUGATTI RIMAC D.O.O., Sveta Nedelja (HR)

( * ) Notice: Subject to any disclaimer, the term of this patent is extended or adjusted under 35 U.S.C. 154(b) by 500 days.

(21) Appl. No.: 18/334,646

(22) Filed: Jun. 14, 2023

(65) Prior Publication Data

US 2023/0399063 A1 Dec. 14, 2023

(30) Foreign Application Priority Data

Jun. 14, 2022 (EP) .................................... 22178823

(51) Int. Cl.
*B62D 37/02* (2006.01)
*B60K 11/02* (2006.01)
(Continued)

(52) U.S. Cl.
CPC ........... *B62D 37/02* (2013.01); *B62D 35/005* (2013.01); *B62D 35/007* (2013.01); *B62D 35/02* (2013.01); *B60K 11/02* (2013.01)

(58) Field of Classification Search
CPC .... B62D 37/02; B62D 35/005; B62D 35/007; B62D 35/02; B60K 11/02; Y02T 10/82
See application file for complete search history.

(56) References Cited

U.S. PATENT DOCUMENTS 9,827,957 B2 * 11/2017 Fahland .................... B60T 8/26
10,308,294 B2 * 6/2019 Yoon ...................... B62D 37/02
(Continued)

FOREIGN PATENT DOCUMENTS

DE 102016217565 3/2017
DE 102017116389 1/2018
(Continued)

OTHER PUBLICATIONS

EPO, Extended European Search Report for EP Application No. 22178823.5, Nov. 18, 2022.

*Primary Examiner* — Lori Lyjak
(74) *Attorney, Agent, or Firm* — Dennemeyer & Associates LLC

(57) ABSTRACT

The vehicle includes a front end and a rear end, the front end and the rear end being located at a front height and at a rear height; a front aero assembly associated to and active in proximity and/or in correspondence of the front end and adapted to generate a front aerodynamic force; and a rear aero assembly associated to and active in proximity and/or in correspondence of the rear end and adapted to generate a rear aerodynamic force. The vehicle further includes a management and control system so as to contain and/or limit, under transient conditions including at least a longitudinal and/or lateral acceleration or deceleration of the vehicle occurring from the condition of travel at a given constant speed, variations of the front height and/or the rear height to be respectively greater or equal to a front end threshold height and a rear end threshold height.

17 Claims, 4 Drawing Sheets

(51) Int. Cl.
  _B62D 35/00_ (2006.01)
  _B62D 35/02_ (2006.01)

(56) References Cited

U.S. PATENT DOCUMENTS

| | | | | |
|---|---|---|---|---|
| 2017/0080987 | A1 | 3/2017 | Morgan | |
| 2017/0088192 | A1* | 3/2017 | Auden | B62D 35/007 |
| 2017/0088200 | A1* | 3/2017 | Heil | B62D 37/02 |
| 2017/0158257 | A1* | 6/2017 | Fahland | B62D 35/02 |
| 2019/0100194 | A1* | 4/2019 | Fahland | B60W 30/18109 |
| 2020/0385070 | A1* | 12/2020 | Cattell | B62D 37/02 |

FOREIGN PATENT DOCUMENTS

| | | | | |
|---|---|---|---|---|
| DE | 102017124870 A1 * | 4/2018 | | B62D 35/007 |
| DE | 102018117897 | 1/2019 | | |

* cited by examiner

ACTIVE AERODYNAMICS SYSTEM FOR A VEHICLE

CROSS-REFERENCE TO RELATED APPLICATION

This application claims priority to European Patent Application No. 22178823.5, filed Jun. 14, 2022, the entire disclosure of which is incorporated herein by reference.

FIELD OF THE INVENTION

The present invention pertains to the technical field of automobiles. In particular, the present invention relates to an active aerodynamics system for an automobile.

BACKGROUND OF THE INVENTION

It is known in the art that certain kind of vehicles (not just flying machines, but also terrestrial two- or three- or four-wheelers) need an accurate balancing and determination of aerodynamic lift and drag, owing to their high-performance nature or as a function of obtaining energetic efficiency or noise reduction while moving at relatively high speeds: to these aims, a range of aerodynamic devices is generally known (front and rear spoilers/splitters, air ducts and general design of the vehicle body can be regarded as different examples over a wide range of applications), and such devices may be "fixed" (that is, they do not change their shape or position when the vehicle is moving) or may be dynamically changing configurations according to various kinds of logic. which are generally implemented by automatic or semi-automatic control systems.

Currently known "active aerodynamics" setups for vehicles are generally configurable in a "low drag" condition, wherein the overall aerodynamic force exerted on the vehicle body is minimized, for example in order to obtain a higher top speed or to obtain a better energetic efficiency (e.g., when the vehicle itself is running in a straight line) and a "high downforce" condition wherein the overall aerodynamic force is maximized (e.g., when the vehicle is braking or running through a corner).

These known-type aerodynamic systems have, however, drawbacks which are mainly related to the known performance envelopes of "traditional" automobiles and which are also related to the fact that the increase or decrease of the overall aerodynamic force is generally chosen as a function of the mere speed of the vehicle: otherwise stated, it can be seen that active aerodynamics systems known in the art operate in order to determine a variation of aerodynamic force/load on the vehicle body without taking into account important variations of vehicle dynamic parameters which are indirectly linked to the vehicle speed (but which have a strong influence on the dynamic behavior of the vehicle during transient conditions or during complex maneuvers).

Another significant disadvantage of the active aerodynamics systems known in the art relies in the fact that they are generally designed to cope with vehicle masses and accelerations/decelerations occurring in vehicles not belonging to the category of the so-called "hypercars", while in contrast modern ultra-high-performance vehicles belonging to this ultra-high-tier/category have a significantly higher mass (which could be about two tonnes or more) with an even higher torque output (which can be over two or three times higher than the "ICE" known vehicles): therefore, such known-type active aerodynamic systems are not capable of properly managing the extreme performance envelope of hypercars.

In the extreme niche of the so-called "hypercars", notable difference arises in the torque-to-weight ratio of electrical hypercars with respect to ICE hypercars, along with an overall amount of sheer peak power (hypercars provided with electrically-powered powertrains can easily exceed a range value of 1000-1500 HP and even higher than 2000 HP): this leads to the fact that known-type aerodynamic systems are not capable of responding with sufficient accuracy and with the proper reaction time to the very "steep" variations of vehicle dynamic status during the transients to which such extremely powerful and heavy cars can be subjected.

Otherwise stated, the significantly higher level of accelerations and/or decelerations attainable by hypercars provided with electrically-powered powertrains, associated with the significantly higher effect on the so-called "weight transfer" during these accelerations and decelerations (which can occur up to or down from very high speeds, even exceeding 300 km/h by a notable margin) cannot be properly dealt with utilizing aerodynamic systems usually retrievable in the State of the Art, since these known-type systems are non-capable of generating in very short period of time a significant variation of aerodynamic force which is helpful in governing the vehicle transients (e.g., and in particular, in relationship to the control of the mass/weight dynamic distribution over the vehicle's axles or single wheels).

SUMMARY OF THE INVENTION

Therefore, having stated the prior art drawbacks, it is an object of the present invention to provide an active aerodynamics system which allows for a greater and better "response" to the extreme transient conditions which can occur to a very high performance vehicle (having a very high static mass value and capable of gaining very high speeds with related high capability of increasing and decreasing such speed over very short periods of time) and also which allows for the synergic obtainment of related advantages in managing the overall operating status of the vehicle itself (e.g. cooling efficiency, achievement of better performance when the vehicle is engaged in complex maneuvers departing from a straight trajectory, overall noise and/or turbulence reduction and so on).

These aims, along with other technical advantages, will be illustrated and achieved by a so-called "active aerodynamic system" according to the present invention as described and claimed hereinafter, and represented in an exemplificative yet not limiting embodiment in the annexed figures.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

Figure 1:
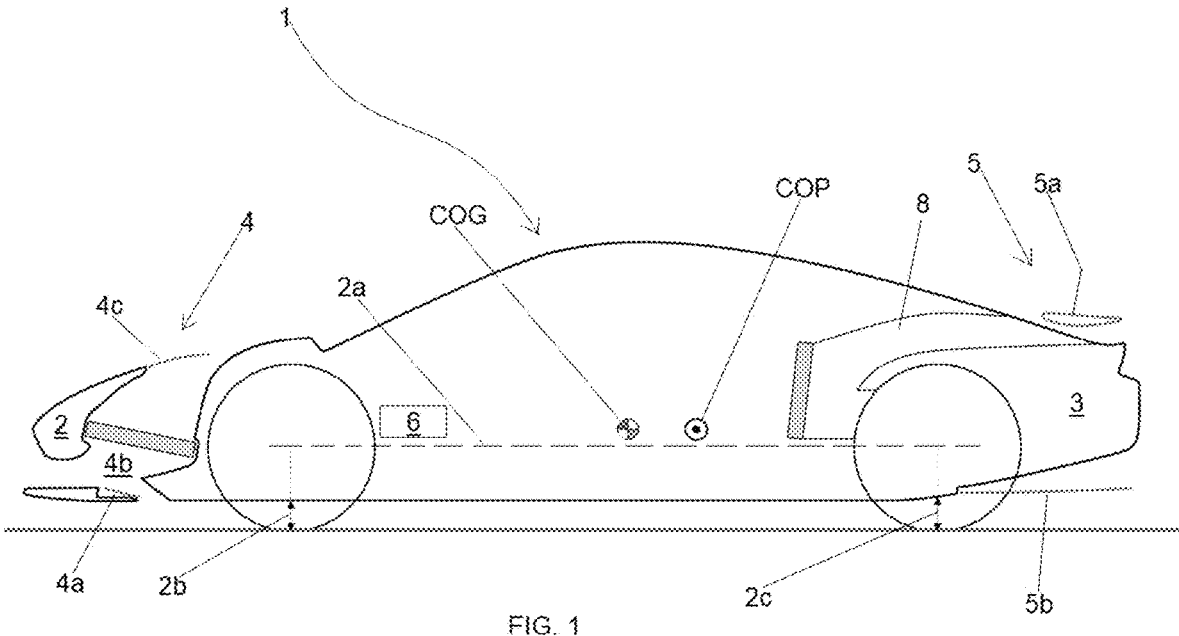
FIGS. 1 and 2 are schematic longitudinal views of a vehicle encompassing a possible embodiment of the active aerodynamics system according to the invention, wherein its structural sub-components are shown in two exemplificative (yet not limitative) different possible positions/locations/configurations.
Figure 2:
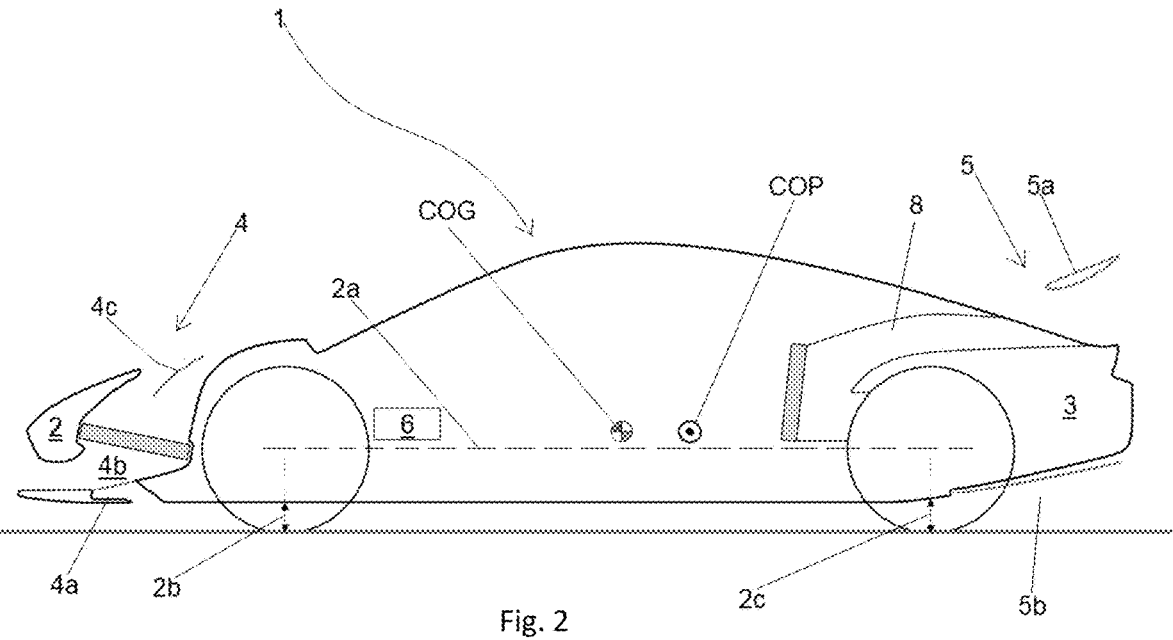
Figure 3:
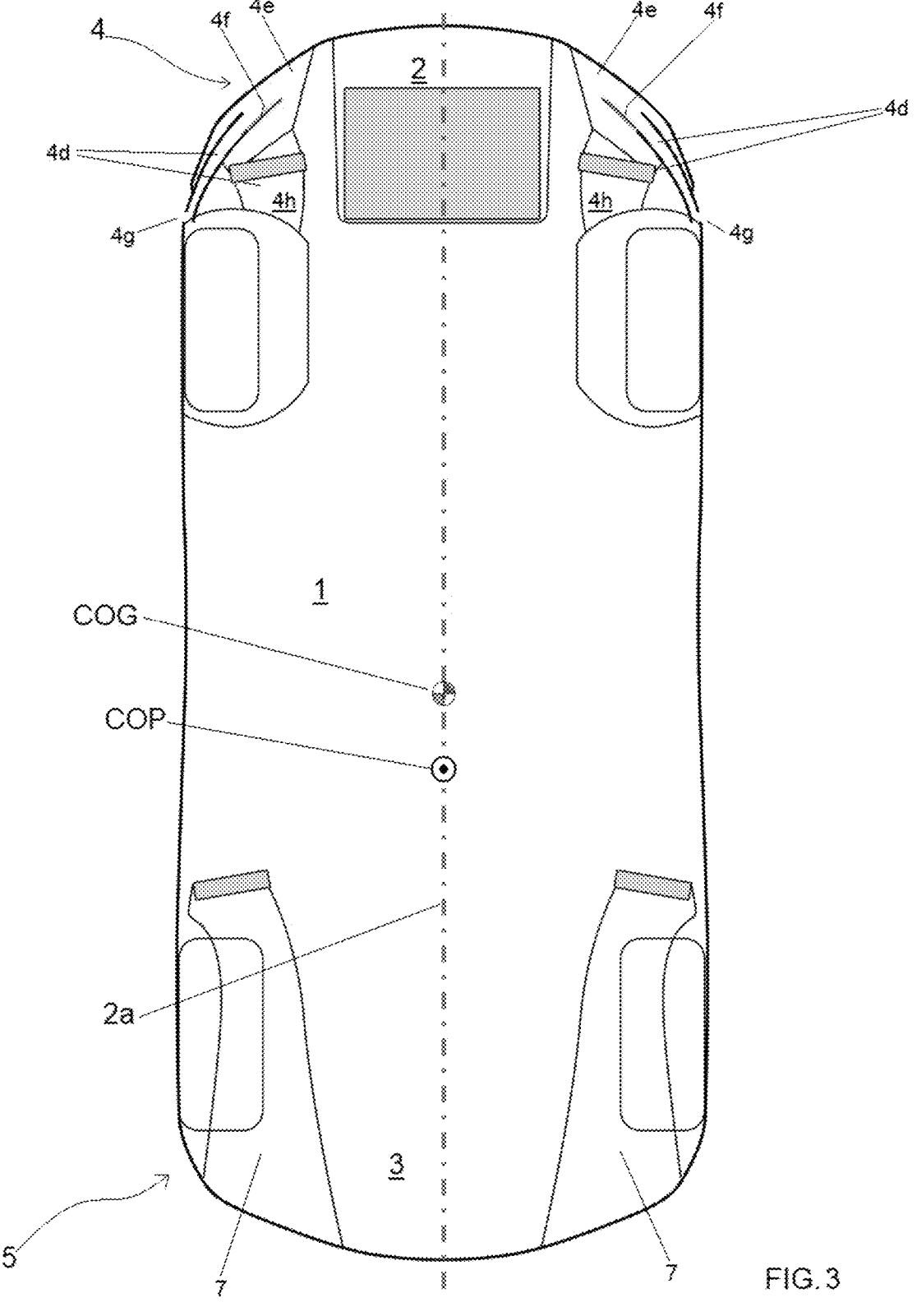
FIGS. 3 and 4 are schematic views from above of the vehicle in FIG. 1 showing further possible sub-components of the active aerodynamics system according to the invention (such further possible sub-components being represented in two exemplificative, yet not limitative, different possible positions/locations/configurations).
Figure 4:
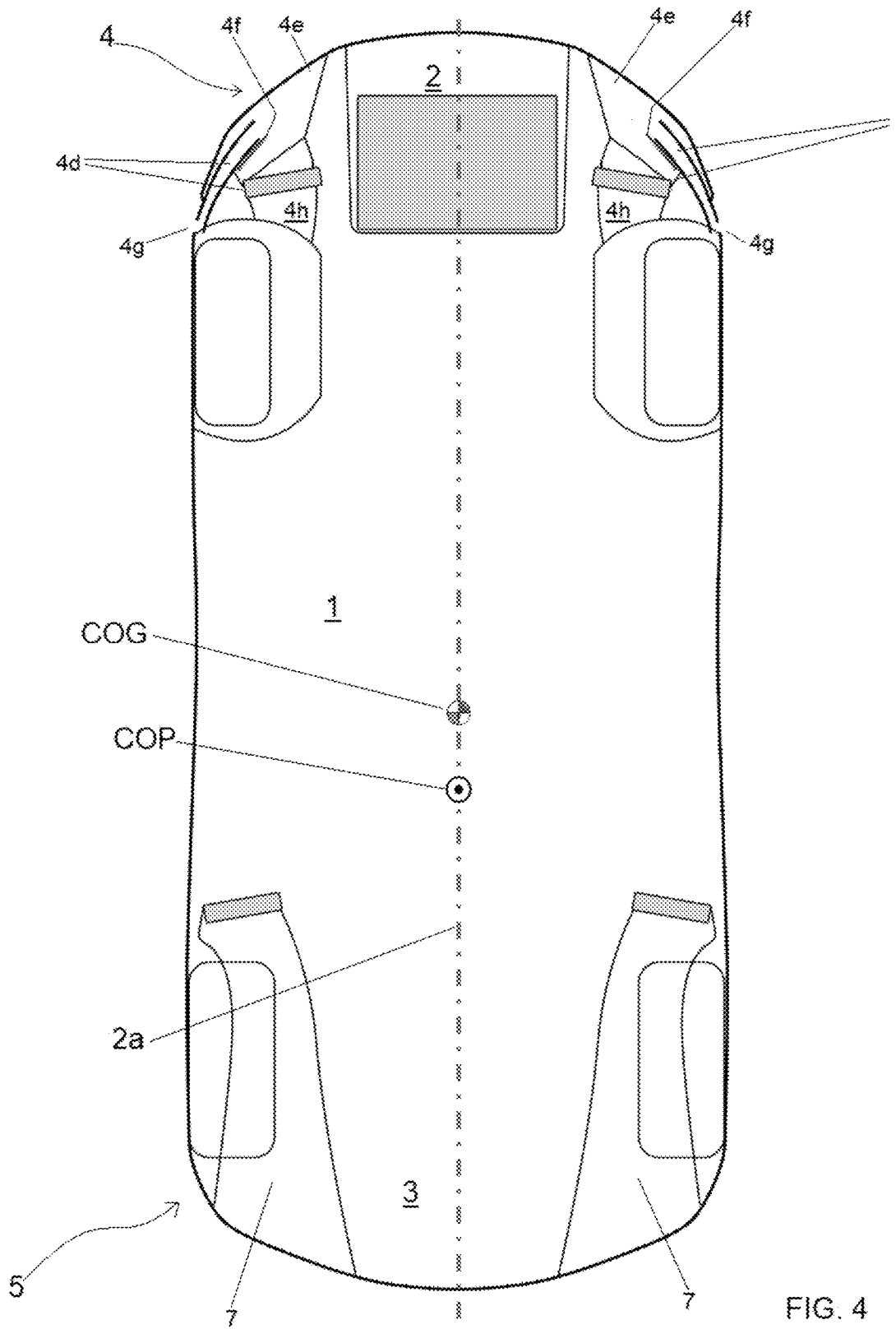

For a thorough understanding of the present invention, reference is to be made to the following detailed description, including the appended claims, in connection with the above-described drawings. Although the present invention is described in connection with exemplary embodiments, the present invention is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The terms, "a" and "an" herein do not denote a limitation of quantity, but rather denote the presence of at least one of the referenced item.

In the annexed figures, the active aerodynamics system according to the invention as a whole is installed on a vehicle (numbered with reference "1" in the annexed drawings) which has a front end (2) and a rear end (3): conveniently, the rear end (3) is located opposite to the front end (2) along a longitudinal axis (2a) of vehicle's development: each of the front end (2) and rear end (3) are respectively located at a front height (2b) and at a rear height (2c) with respect to a travelling ground in a condition of travel at a given constant speed of said chassis (and such heights, or "ride heights" in common automotive jargon) may be regarded as "nominal" and essentially deriving from various conditions relating to the vehicle setup and driving conditions (longitudinal travel speed, uniformity of the travelling surface, presence of one or more occupants and/or payload and so on).

The system according to the invention comprises a front aero assembly (4), which is associated to and is actually "active" in proximity and/or in correspondence of the front end (2) (e.g., in order to generate a so-called "front aerodynamic force") and a rear aero assembly (5) associated to and active in proximity and/or in correspondence of the rear end (3) (in order to generate a corresponding "rear aerodynamic force"): advantageously, the system according to the present invention further comprises management and control system (6) which are active on the front aero assembly (4) and/or on the rear aero assembly (5) so as to contain and/or limit, under transient conditions—which for example may imply that the vehicle (1) is undergoing a longitudinal and/or lateral acceleration or deceleration, occurring from said condition of travel at a given constant speed, variations of said front height (2b) and/or said rear height (2c) to be respectively greater or equal to a front end threshold height and a rear end threshold height.

In terms of difference with respect to known active aerodynamics systems, it is to be noted that the present invention achieves a peculiar control logic, whereby the determination of the downforce, and its distribution over the two axles of the vehicle (1) is not simply linked to the sheer linear speed of the vehicle, but it is connected in a "feedback loop" with a geometric riding/driving parameter (the ride height or heights) which has a strong influence on the vehicle dynamic mass distribution and therefore which has a large influence on the behavior of the vehicle in transient conditions: therefore, the intervention of the present invention's system affects the vehicle dynamics in a way which is simply not provided for (not even foresighted) by known art's systems.

It is also to be noted that the present invention may be set-up for dealing mainly with one-directional acceleration (e.g. positive or negative variation of travelling speed along the longitudinal axis (2a)), but it may also be structurally and functionally implemented in order to manage variation of ride heights occurring to the insurgence of acceleration along and/or around other axes of the vehicle (1) (and namely, around or along the yaw axis or the roll axis, since these transient conditions may result in a variation of ride heights not just limited in difference from the front to the back but also from one side to the other side of the vehicle itself): for example, the system according to the invention may also manage/control transient situations related to lateral acceleration/stability, as during cornering, e.g. in order to move the so-called "COP" (Center of pressure) more towards the front axle in order to improve the cornering radius of the vehicle (1).

Delving deeper into details, it can be seen that the afore cited management and control system (6) comprises a suitable sensor adapted to measure one or more dynamic parameters related to the variations of the front height (2b) and/or of the rear height (2c) (and/or, conveniently, to the "transient conditions" exemplified hereabove), an elaborating unit adapted to receive as an input the just cited dynamic parameters and capable of calculating and emitting a command output towards the front aero assembly (4) and/or to the rear aero assembly (5) and actuator operatively acting on the front aero assembly (4) and/or on the rear aero assembly (5) and adapted to receive said command output: according to a functional aim of the invention, the management and control system (6) is therefore adapted to limit or nullify rotations of the vehicle (1) around a pitching axis (2d) perpendicular to said longitudinal axis (2a) and substantially parallel to a ground whereupon said vehicle (1) is travelling.

Looking at the annexed FIG. 1, it can be seen that the front aero assembly (4) may comprise a movable flap (4a), which may be located in proximity and/or in correspondence of the front end (2) (e.g., located on a front portion of an underbody of the vehicle (1)): in order to perform its most suitable functions, such a flap (4a) is reversibly configurable at least between:

a first angular position, in which it generates a first amount of front downforce applied to the front end (2) by diverting an airflow in an upward and rearward direction relating to a direction of travel of the vehicle (1); and a second angular position rotatably displaced with respect to said first angular position, in which it generates a second amount of downforce lesser than the just cited first amount of front downforce by diverting said airflow in a downward and rearward direction relating to said direction of travel of the vehicle (1).

The diverting capabilities of the flap (4a) can be, if required, integrated with other structures and functionalities of the vehicle (1): for example, the flap (4a) can be operated so as to manage an airflow upward and towards the vehicle's radiators thereby maximizing or minimizing the airflow rate directed to the radiators themselves: in this way, beside the variation of the front downforce, also a variation of cooling effect can be selectively determined or chosen.

According to a possible and optional embodiment of the invention, the front aero assembly (4) may further comprise a front aerodynamic active element located in proximity and/or in correspondence of the front end (2): such front aerodynamic active element (which is not represented in FIG. 1 but which can be realized in any suitable form by a skilled technician operating in the sector of pertinence of the present invention, e.g. a wing-shaped element or a so-called active front splitter and so on) may be located on a front portion of an underbody of the vehicle (1) so as to be reversibly configurable at least between:

a first pitch angle and/or height with respect to the longitudinal axis (2*a*), in which it generates a first amount of front downforce applied to the front end (2) by generating a first aerodynamic force directed downwards with respect to the vehicle (1); and a second pitch angle and/or height with respect to the longitudinal axis (2*a*) displaced with respect to the first pitch angle and/or height, in which it generates a second aerodynamic force lesser than and/or upwards directed with respect to said first aerodynamic force.

The flap (4*a*) and the front aerodynamic active element just described may be working in coordination with each other, or they may also be present as independent (or "standalone") devices in the front aero assembly (4), depending on the operative requirements and/or on the overall need of maximum or minimum front downforce set as a design parameter for the vehicle (1).

Looking once more at the details, the front aero assembly (4) may further comprise a channeling duct (4*b*) having an inlet (e.g. located in the front end (2) of the vehicle (1), as per FIG. 1) and an outlet (e.g. located in an upper portion of the vehicle (1)) downstream with respect to the inlet: in this possible embodiment, the movable flap (4*a*) and/or the front aerodynamic active element being active in said channeling duct (4*b*).

As a further possible structural option in the present invention, the front aero assembly (4) may comprise a splitter (4*c*) aerodynamically active in proximity and/or in correspondence of the channeling duct (4*b*) itself (e.g. this splitter can be located in the area corresponding to the so-called "bonnet" of the vehicle, and it can also be regarded as a so-called "flap" in the technical jargon of the present invention), so as to be reversibly configurable at least between:

a first discharging configuration, in which it determines a first outlet cross-section of the channeling duct (4*b*) (and because of this, the just cited first cross-section determines a first average airspeed and a first air mass flow rate of an airflow exiting from said channeling duct (4*b*)); and a second discharging configuration, in which it determines a second outlet cross-section of the channeling duct (4*b*) (which consequently determines a second cross-section of the channeling duct (4*b*) greater than the first cross-section of the channeling duct (4*b*), determining also a second average airspeed and a second average air mass flow rate respectively greater than the first average airspeed and greater than the first air mass flow rate.

It is to be observed that the just cited splitter (4*c*) also affects (front) downforce by a significant margin, and more in detail, by reversibly shifting between its first discharging configuration and its second discharging configuration it determines a minimum/maximum variation of net total (front) air flow rate which trades off between maximum top speed of the vehicle (1) and range/efficiency of the vehicle (1) itself.

Conveniently, the front aero assembly (4) may further comprise at least one (and, for example, two) variable-configuration side channeling duct(s) (4*d*) which are aerodynamically active on at least one, and typically on two mutually opposite lateral portions of the front end of the vehicle (1).

From a structural standpoint, a channeling duct (4*d*) comprises a side inlet (4*e*), a first side outlet (4*g*) (located downstream to the side inlet (4*e*) and located in proximity and/or in correspondence of an external side of the vehicle (1)), a second side outlet (4*h*) (located downstream to said side inlet (4*e*) and facing into a wheel arch in which a front wheel of the vehicle (1) is located) and at least a movable vane (40 located between the side inlet (4*e*) and the first and/or side outlet (4*g*; 4*h*): from a functional standpoint, such movable vane (40 is reversibly configurable at least between a first diverting configuration, wherein an airflow passing through said variable-configuration side channeling duct (4*d*) is discharged towards the external side of the vehicle (1), and a second diverting configuration wherein said airflow passing through said variable-configuration side channeling duct (4*d*) is discharged into the wheel arch (and optionally, in such a second position radiator air mass flow would increase and air will exit to the wheel arch).

Focusing now the attention on the rear aero assembly (5) and looking at the annexed FIG. 1, it can be observed that this structural sub-group of elements pertaining to the invention may comprise a rear wing-shaped element (5*a*) located in proximity and/or in correspondence of the rear end (3) (e.g., it can be located on a rear upper portion of the vehicle (1)): conveniently, the just cited rear wing-shaped element (5*a*) may be reversibly configurable at least between:

a first condition, in which it generates a first amount of rear upper downforce and a first amount of rear "upper" aerodynamic drag applied to the rear end (3); and a second condition displaced with respect to the first condition, in which it generates a second amount of rear upper downforce greater than said first amount of rear upper downforce and/or in which it generates a second amount of rear "upper" aerodynamic drag greater than the first amount of rear "upper" aerodynamic drag.

According to the present invention, it is observed that the term "upper" rear downforce is referred to aerodynamic effects generated by structural elements which essentially act on the top portion of the vehicle tail or boot or terminal bodywork; at the same time, it is also to be observed that the rear wing-shaped element (5*a*) is also dealing, throughout its varying conditions, with a variation of side effects such as influencing rear diffuser (5*b*) effectiveness and/or possible airflow towards and/or from any rear radiators fitted in the vehicle (1).

Therefore, the rear wing-shaped element (5*a*) also determines a trade-off between the maximum theoretical top speed of the vehicle (1) and its range and/or energetic efficiency (both intended from the thermal and from the aerodynamic standpoint), as already explained regarding some structural components of the front aero assembly (4).

In a possible synergistic coordination with the rear wing-shaped element (5*a*), the rear aero assembly (5) may further comprise a rear diffuser (5*b*) located in proximity and/or in correspondence of the rear end (3) (e.g., located on a rear lower or underbody portion of the vehicle (1)) so as to be reversibly configurable at least between:

a first position, in which it generates a first amount of rear "lower" downforce and a first amount of rear "lower" aerodynamic drag applied to the rear end (3); and a second position displaced with respect to said first condition, in which it generates a second amount of rear "lower" downforce greater than the just cited first amount of rear lower downforce and/or in which it generates a second amount of rear lower aerodynamic drag greater than the first amount of rear lower aerodynamic drag.

According to the present invention, it is observed that the term "lower" rear downforce is referred to aerodynamic effects generated by structural elements which essentially act on the bottom (or "closer to the travelling ground") portion of the vehicle tail or boot or terminal bodywork, given that the upper and lower rear downforce may act in mutual combination and may be selectively determined according to the various operative requirements of the vehicle (1) and/or of the active aerodynamics system.

According to the present invention, the two "separate" (that is, upper and lower) contributions to the overall rear downforce coming from the rear wing and from the movable underbody can be considered as cooperatively determining an overall rear downforce: otherwise stated, the lower and upper rear downforce define a total rear downforce value and/or distribution which is suitably managed by the present invention.

According to a further operative aspect of the present invention, the management and control system (6) is adapted to measure and elaborate (and therefore, are adapted to use as operating input conditions for determining the selective variation of configuration of its related structural components/elements) one or more of the following dynamic parameters:

a real-time front height (2b) and/or a real-time rear height (2c);

a real-time travelling speed of the vehicle (1);

a linear acceleration or deceleration of the vehicle (1) in a travelling direction and/or along the longitudinal axis (2a);

a steering angle output resulting at front wheels of the vehicle (1);

a steering angle input resulting at a steering command of the vehicle (1);

a temperature of powertrain component (e.g., such component may be a battery pack, an inverter, a motor, a gearbox or a radiator and such a temperature may be a temperature of a coolant flowing inside such powertrain component);

a rotational speed of the vehicle (1) around a pitch axis;

a rotational acceleration of the vehicle (1) around said pitch axis;

a linear variation ratio, over time, of the front height (2b) and/or of the rear height (2c) along a pitching direction substantially perpendicular with respect to said travelling ground; and(/or)

a linear acceleration of the front height (2b) and/or of the rear height (2c) along said pitching direction.

By exploiting one or more of the hereabove depicted parameters/inputs, the management and control system (6) is conveniently capable of calculating and emitting a command output, which in turn may comprise at least one or more of the following command parameters:

an adjustment angle of the movable flap (4a);

an actuation speed of the movable flap (4a);

an adjustment angle of the front aerodynamic active element;

an actuation speed of the front aerodynamic active element;

an adjustment angle of the splitter (4c);

an actuation speed of the splitter (4c);

an adjustment angle and/or position and/or an actuation speed of said at least a movable vane (40;

an adjustment angle of the rear wing-shaped element (5a);

an adjustment height of the rear wing-shaped element (5a)

an actuation speed of the rear wing-shaped element (5a);

an adjustment angle of the rear diffuser (5b); and an actuation speed of the rear diffuser (5b).

According to a possible and optional embodiment of the invention, the channeling duct (4d) (which in the annexed figures is represented as a fixed-geometry feature) may be implemented as a variable-geometry conduit: in this embodiment, the management and control system (6) may also be conveniently capable of calculating and emitting a command output which may also comprise command parameters that are related to any kind of possible geometry modification of the channeling duct (4d) itself.

Otherwise stated, the entire vehicle front and/or rear and/or right-left side aerodynamic loads can be selectively varied according to the "intervention/feedback logic" of the invention (e.g., in order to keep ride heights in various points of the vehicle underbody to be kept above pre-determined threshold values).

In an even further possible embodiment of the present invention, at least one, and typically two side aero assemblies (respectively associated to and active in proximity and/or in correspondence of at least one side, and typically to each sides of the vehicle (1), and therefore respectively adapted to generate side aerodynamic forces) may be present: such side aerodynamic forces may be independently generated for each side of the vehicle (1), and in view of obtaining such a freedom of intervention/determination/generation the management and control system (6) is also active on said side aero assembly or assemblies so as to contain and/or limit, under transient conditions comprising at least a rotational acceleration and/or deceleration of said vehicle (1) around a roll axis and/or around a yaw axis, variations of at least one side height and preferably each side heights to be respectively greater or equal to a side or sides threshold height (or heights).

According to the invention, the linear and/or angular positions of each structural element belonging to the present active aerodynamic system, and their variation/combination in height and/or position and/or angle can be independently and fully adjustable.

According to various possible structural embodiments of the just cited "front+rear+one or two side" aero assemblies' layout, at least one side aero assembly may typically comprise:

one or more side movable flaps;

one or more side active aerodynamic elements;

one or more side wing-shaped elements;

one or more side channeling ducts; and one or more side splitters (e.g., active in proximity and/or in correspondence of the just cited side channeling ducts); and/or one or more side diffusers, And more generally such implementing options may conveniently be linked to the additional presence, in the management and control system (6) of:

a sensor adapted to measure one or more lateral dynamic parameters related to said variations of the side front height or heights and/or to the so-called transient conditions;

a sensor adapted to measure one or more thermal parameters related to a working condition of at least one vehicle radiator or heat sink (or any other powertrain component/coolant, if required) and/or to measure thermal parameters related to an overheating condition of the vehicle (e.g., these sensors are related to a function of opening suitable "vents" in the vehicle in occurrence of said overheating condition);

an elaborating unit adapted to receive as an input said lateral dynamic parameters and capable of calculating and emitting a lateral command output towards one (or more) side aero assembly (or assemblies); and an actuator operatively acting on the side aero assembly (or assemblies) and adapted to receive the just cited lateral command output.

From a functional standpoint, it can be seen that the present invention's management and control system (6) is capable of longitudinally shifting a position of the so-called "center of pressure" (COP) (which location is related to aerodynamic forces exerted on the vehicle (1)): the center of pressure (COP) may for example be shifting (at least) along the longitudinal axis (2a) and, by appropriate set-up and/or re-configuration of the active aerodynamics system, be reversibly configurable at least between:

a first longitudinal position, in which it is placed upstream or in front of a center of gravity (COG) of the vehicle (1), with respect to a travelling direction of the vehicle (1) itself, and a second longitudinal position in which it is placed downstream or behind with respect to the center of gravity (COG) of the vehicle (1), with respect to a travelling direction of the vehicle (1) itself.

According to the present invention, the just cited "shifting" of the center of pressure (COP) is determined (at least) as a function of the fact that the front height (2b) and/or the rear height (2c) is and/or are respectively greater or equal to a front end threshold height and a rear end threshold height.

Still it is to be observed that the downforce effects which are obtainable by the active aerodynamics system according to the invention may be relatively smaller (in their value or "moduli") compared to inertial loads, but notwithstanding this difference in net value they can be still capable to exert a significant contribution in reducing the so-called "vehicle dive", which in turn affects the air flow passing through underbody (and therefore helps in the generation of rear downforce): in this way, it can be seen that the present invention also devises an overall "control logic" to be applied onto a high performance vehicle wherein the aerodynamic effects are used to control the vehicle's orientation in space, and this orientation in space is directed also to maintain an overall vehicle condition in which the aerodynamic loads can be still kept at their optimal values (and therefore their beneficial effect in vehicle stabilization can be exploited over a longer period of time.

Coming back to the movements of the Center Of Pressure (COP), it can be observed that the second longitudinal position of the center of pressure (COP) may be occurring in correspondence of a longitudinal deceleration (e.g., in correspondence to a braking transient) of the vehicle (1) along its axis (2a): typically, when the center of pressure (COP) is shifted in its second longitudinal position behind the center of gravity (COG) in a transient time, the just cited transient time can be estimated at less than 1 second (this advantageously allows to enhance the rear downforce, countering the effects of inertia and giving the rear vehicle brakes a better working condition thanks to the reduction of the weight shift towards the front axle).

According to a further aspect of the present invention, the management and control system (6) may also be capable of laterally shifting a position of said center of pressure (COP) at least sideways with respect to the longitudinal axis (2a): otherwise stated, the center of pressure (COP) may reversibly be configurable at least between a first lateral position (in which it is placed upstream or downstream of the center of gravity (COG) in a first laterally shifted position with respect to the longitudinal axis (2a)) and a second lateral position (in which it is placed upstream or downstream of the center of gravity (COG) in a second laterally shifted position with respect to the longitudinal axis (2a)).

The just cited second laterally shifted position is, in the example hereabove introduced, substantially opposed to the first laterally shifted position with respect to the longitudinal axis (2a), and as a consequence of this a lateral shifting of the center of pressure (COP) is conveniently determined at least as a function of the front height (2b) and/or of the rear height (2c) and/or the (at least one) side height and/or said each side heights: one or more of these ride heights will be managed and controlled so as to be respectively greater or equal to a front end threshold height and a rear end threshold height (and once again, the active aerodynamic system according to the invention is employed to achieve a ride height balancing throughout various points in the vehicle underbody).

The described, illustrated and claimed invention achieves the technical aims and surpasses the shortcomings of the prior art hereabove mentioned, and in first instance it provides a system which is greatly capable of enhancing the vehicle dynamics under extreme transients: actually, the ride height(s) control achieved through aerodynamic elements can be efficiently controlled even during the most demanding driving situations, for example during hard braking from high speeds: in these situations, the contribution of the active aerodynamic system in terms of preventing the vehicle from the so-called "bottom-downs" (that is, whenever the ride height and/or the vertical travel of the front or of the rear suspension is reduced to a point wherein the suspension is actually non-functional) greatly helps in maintaining the vehicle itself drivable, maximizing the mechanical grip at the wheels and therefore maintaining a high level of braking capability along with a high level of directionality.

Beside this, it is to be remarked that the overall structural architecture of the aerodynamics system can be simply and quickly integrated within the vehicle chassis and/or body, and its actuation sub-systems can be efficiently governed by the onboard electronics' suite: this leads also to a high integration grade of the system itself with the overall vehicle management electronics' suite and allows for an even deeper and "richer" interactions in terms of determining the driving dynamics and/or various vehicle configurations which may lead to different results in terms of responsiveness to the driver's inputs.

Furthermore, the aerodynamic system according to the present invention can also be configured (even temporarily, e.g., when very peculiar conditions arise independently from the transient driving conditions in which the vehicle itself is currently being involved) in order to help some auxiliary functions as cooling of the engine and/or the battery pack and/or the braking system.

Another significant advantage of the present invention relies in the fact that the active aerodynamics system according to the present invention can be implemented in any other embodiment enclosed in its inventive concept as claimed, also by way of collateral modifications available to a skilled technician in the technical sector of pertinence of the invention itself, and thus maintaining the functional achievements of the invention along with practicality of production, usage, assembly and maintenance.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, to thereby enabling others skilled in the art to best utilize the present invention and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present invention.

The invention claimed is:

1. A vehicle, comprising:
a front end and a rear end opposite to the front end along a longitudinal axis, the front end and the rear end being located at a front height and at a rear height with respect to a travelling ground in a condition of travel at a given constant speed of a chassis of the vehicle;
a front aero assembly associated to and active in proximity and/or in correspondence of the front end and adapted to generate a front aerodynamic force;
a rear aero assembly associated to and active in proximity and/or in correspondence of the rear end and adapted to generate a rear aerodynamic force;
a management and control system active on the front aero assembly and/or on the rear aero assembly so as to contain and/or limit, under transient conditions comprising at least a longitudinal and/or lateral acceleration or deceleration of the vehicle occurring from the condition of travel at a given constant speed, variations of the front height and/or the rear height to be respectively greater or equal to a front end threshold height and a rear end threshold height;
wherein the management and control system comprises:
a sensor adapted to measure one or more dynamic parameters related to the variations of the front height and/or of the rear height and/or to the transient conditions;
an elaborating unit adapted to receive as an input the dynamic parameters and configured to calculate and emit a command output towards the front aero assembly and/or to the rear aero assembly; and
an actuator operatively acting on the front aero assembly and/or on the rear aero assembly and adapted to receive the command output;
wherein the management and control system is adapted to limit rotations of the vehicle around a pitching axis perpendicular to the longitudinal axis and substantially parallel to a ground whereupon the vehicle is travelling;
wherein the front aero assembly comprises a movable flap located in proximity and/or in correspondence of the front end and located on a front portion of an underbody of the vehicle, the movable flap being reversibly configurable at least between:

a first angular position in which it generates a first amount of front downforce applied to the front end by diverting an airflow in an upward and rearward direction relating to a direction of travel of the vehicle; and
a second angular position rotatably displaced with respect to the first angular position, in which it generates a second amount of front downforce lesser than the first amount of front downforce by diverting the airflow in a downward and rearward direction relating to the direction of travel of the vehicle.

2. The vehicle of claim 1, wherein the front aero assembly further comprises a front active aerodynamic element located in proximity and/or in correspondence of the front end and located on a front portion of an underbody of the vehicle, the front active aerodynamic element being reversibly configurable at least between:
a first pitch angle and/or height with respect to the longitudinal axis, in which it generates a first amount of front downforce applied to the front end by generating a first aerodynamic force directed downwards with respect to the vehicle; and
a second pitch angle and/or height with respect to the longitudinal axis displaced with respect to the first pitch angle and/or height, in which it generates a second aerodynamic force lesser than and/or upwards directed with respect to the first aerodynamic force.

3. The vehicle of claim 2, wherein the front aero assembly further comprises a channeling duct having:
an inlet located in the front end of the vehicle; and
an outlet located in an upper portion of the vehicle located downstream with respect to the inlet;
wherein the movable flap and/or the front active aerodynamic element are active in the channeling duct.

4. The vehicle of claim 3, wherein the front aero assembly further comprises a splitter aerodynamically active in proximity and/or in correspondence of the channeling duct, the splitter being reversibly configurable at least between:
a first discharging configuration in which it determines a first outlet cross-section of the channeling duct, the first cross-section determining a first average airspeed and a first air mass flow rate of an airflow exiting from the channeling duct; and
a second discharging configuration in which it determines a second outlet cross-section of the channeling duct, the second cross-section of the channeling duct being greater than the first cross-section of the channeling duct and determining a second average airspeed and a second average air mass flow rate of the airflow exiting from the channeling duct which are respectively greater than the first average airspeed and greater than the first air mass flow rate.

5. The vehicle of claim 4, wherein the front aero assembly further comprises at least one variable-configuration side channeling ducts aerodynamically active on at least one mutually opposite lateral portions of the front end of the vehicle, the at least one variable-configuration side channeling ducts comprising:
a side inlet;
a first side outlet located downstream to the side inlet and located in proximity and/or in correspondence an external side of the vehicle;
a second side outlet located downstream to the side inlet and facing into a wheel arch in which a front wheel of the vehicle is located; and
at least a movable vane located between the side inlet and the first and/or side outlet, wherein the movable vane is reversibly configurable at least between a first diverting configuration wherein an airflow passing through the variable-configuration side channeling duct is discharged towards the external side of the vehicle, and a second diverting configuration wherein the airflow passing through the variable-configuration side channeling duct is discharged into the wheel arch.

6. The vehicle of claim 5, wherein the rear aero assembly comprises a rear wing-shaped element located in proximity and/or in correspondence of the rear end and located on a rear upper portion of the vehicle, the rear wing-shaped element being reversibly configurable at least between:

a first condition, in which it generates a first amount of rear upper downforce and a first amount of rear upper aerodynamic drag applied to the rear end; and a second condition displaced with respect to the first condition, in which it generates a second amount of rear upper downforce greater than the first amount of rear upper downforce and/or in which it generates a second amount of rear upper aerodynamic drag greater than the first amount of rear upper aerodynamic drag.

7. The vehicle of claim 6, wherein the rear aero assembly further comprises a rear diffuser located in proximity and/or in correspondence of the rear end and located on a rear lower or underbody portion of the vehicle, the rear diffuser being reversibly configurable at least between:

a first position, in which it generates a first amount of rear lower downforce and a first amount of rear lower aerodynamic drag applied to the rear end; and a second position displaced with respect to the first condition, in which it generates a second amount of rear lower downforce greater than the first amount of rear lower downforce and/or in which it generates a second amount of rear lower aerodynamic drag greater than the first amount of rear lower aerodynamic drag.

8. The vehicle of claim 7, wherein the management and control system is adapted to measure and elaborate one or more of the following dynamic parameters:

a real-time front height and/or a real-time rear height;

a real-time travelling speed of the vehicle;

a linear acceleration or deceleration of the vehicle in a travelling direction and/or along the longitudinal axis;

a steering angle output resulting at front wheels of the vehicle;

a steering angle input resulting at a steering command of the vehicle;

a temperature of powertrain component, the component being a battery pack, an inverter, a motor, a gearbox or a radiator, such temperature being a temperature of a coolant flowing inside the powertrain component;

a rotational speed of the vehicle around a pitch axis;

a rotational acceleration of the vehicle around the pitch axis;

a linear variation ratio, over time, of the front height and/or of the rear height along a pitching direction substantially perpendicular with respect to the travelling ground; and a linear acceleration of the front height and/or of the rear height along the pitching direction;

wherein the management and control system is configured to calculate and emit a command output comprising at least one or more of the following command parameters:

an adjustment angle of the movable flap;

an actuation speed of the movable flap;

an adjustment angle of the front active aerodynamic element;

an actuation speed of the front active aerodynamic element;

an adjustment angle of the splitter;

an actuation speed of the splitter;

an adjustment angle and/or position and/or an actuation speed of the at least a movable vane;

an adjustment angle of the rear wing-shaped element;

an adjustment height of the rear wing-shaped element;

an actuation speed of the rear wing-shaped element;

an adjustment angle of the rear diffuser; and an actuation speed of the rear diffuser.

9. The vehicle of claim 8, further comprising at least one side aero assemblies associated to and active in proximity and/or in correspondence of at least one side of the vehicle and respectively adapted to generate side aerodynamic forces, the side aerodynamic forces being generated independently for each side of the vehicle, the management and control system being also active on the side aero assembly or assemblies so as to contain and/or limit, under transient conditions comprising at least a rotational acceleration and/or deceleration of the vehicle around a roll axis and/or around a yaw axis, variations of at least one side height to be respectively greater or equal to a side or sides threshold height or heights;

wherein the at least one side aero assembly comprises:

one or more side movable flaps;

one or more side active aerodynamic elements;

one or more side wing-shaped elements;

one or more side channeling ducts;

one or more side splitters active in proximity and/or in correspondence of the side channeling ducts; and/or one or more side diffusers;

wherein the management and control system further comprises:

a sensor adapted to measure one or more lateral dynamic parameters related to the variations of a side front height or heights and/or to the transient conditions;

an elaborating unit adapted to receive as an input the lateral dynamic parameters and configured to calculate and emit a lateral command output towards the side aero assembly or assemblies; and an actuator operatively acting on the side aero assembly or assemblies and adapted to receive the lateral command output.

10. The vehicle of claim 9, wherein the management and control system is configured to longitudinally shift a position of a center of pressure (COP) related to aerodynamic forces exerted on the vehicle, the shifting of the center of pressure (COP) occurring at least along the longitudinal axis and being reversibly configurable at least between a first longitudinal position in which it is placed upstream or in front of a center of gravity (COG) of the vehicle, with respect to a travelling direction of the vehicle itself, and a second longitudinal position in which it is placed downstream or behind with respect to a center of gravity (COG) of the vehicle, with respect to a travelling direction of the vehicle itself, the shifting of the center of pressure (COP) being determined at least as a function of the front height and/or of the rear height to be respectively greater or equal to a front end threshold height and a rear end threshold height.

11. The vehicle of claim 10, wherein at least the second longitudinal position of the center of pressure (COP) is occurring in correspondence of a longitudinal deceleration, and preferably in correspondence to a braking transient, of the vehicle along its longitudinal axis.

12. The vehicle of claim 11, wherein the center of pressure (COP) is shifted in the second longitudinal position behind the center of gravity (COG) in a transient time, the time being preferably less than 1 second.

13. The vehicle of claim 12, wherein the management and control system is configured to laterally shift a position of the center of pressure (COP) at least sideways with respect to the longitudinal axis, the center of pressure (COP) being reversibly configurable at least between a first lateral position in which it is placed upstream or downstream of the center of gravity (COG) in a first laterally shifted position with respect to the longitudinal axis, and a second lateral position in which it is placed upstream or downstream of the center of gravity (COG) in a second laterally shifted position with respect to the longitudinal axis, the second laterally shifted position being substantially opposed to the first laterally shifted position with respect to the longitudinal axis, a lateral shifting of the center of pressure (COP) being preferably determined at least as a function of the front height and/or of the rear height and/or at least one side height and/or the each side heights to be respectively greater or equal to the front end threshold height and a rear end threshold height.

14. A vehicle, comprising:
a front end and a rear end opposite to the front end along a longitudinal axis, the front end and the rear end being located at a front height and at a rear height;
a front aero assembly associated with the front end, and adapted to generate a front aerodynamic force; and
a rear aero assembly associated with the rear end, and adapted to generate a rear aerodynamic force, and
a management and control means active on the front aero assembly and/or on the rear aero assembly so as to contain, under transient conditions comprising at least a longitudinal and/or lateral acceleration or deceleration of the vehicle occurring from the condition of travel at a given constant speed, variations of the front height and/or the rear height to be respectively greater or equal to a front end threshold height and a rear end threshold height;
wherein the management and control means are capable of longitudinally shifting a position of a center of pressure (COP) related to aerodynamic forces exerted on the vehicle, the shifting of the center of pressure (COP) occurring at least along the longitudinal axis and being reversibly configurable at least between a first longitudinal position in which it is placed upstream or in front of a center of gravity (COG) of the vehicle, with respect to a travelling direction of the vehicle itself, and a second longitudinal position in which it is placed downstream or behind with respect to a center of gravity (COG) of the vehicle, with respect to a travelling direction of the vehicle itself, the shifting of the center of pressure (COP) being determined at least as a function of the front height and/or of the rear height to be respectively greater or equal to a front end threshold height and a rear end threshold height.

15. The vehicle of claim 14, wherein at least the second longitudinal position of the center of pressure (COP) is occurring in correspondence of a longitudinal deceleration, and preferably in correspondence to a braking transient, of the vehicle along its longitudinal axis.

16. The vehicle of claim 15, wherein the center of pressure (COP) is shifted in the second longitudinal position behind the center of gravity (COG) in a transient time, the time being preferably less than 1 second.

17. The vehicle of claim 16, wherein the management and control means are also capable of laterally shifting a position of the center of pressure (COP) at least sideways with respect to the longitudinal axis, the center of pressure (COP) being reversibly configurable at least between a first lateral position in which it is placed upstream or downstream of the center of gravity (COG) in a first laterally shifted position with respect to the longitudinal axis, and a second lateral position in which it is placed upstream or downstream of the center of gravity (COG) in a second laterally shifted position with respect to the longitudinal axis, the second laterally shifted position being substantially opposed to the first laterally shifted position with respect to the longitudinal axis, a lateral shifting of the center of pressure (COP) being preferably determined at least as a function of the front height and/or of the rear height and/or at least one side height and/or each side heights to be respectively greater or equal to the front end threshold height and a rear end threshold height.

* * * * *